United States Patent Office 2,716,053
Patented Aug. 23, 1955

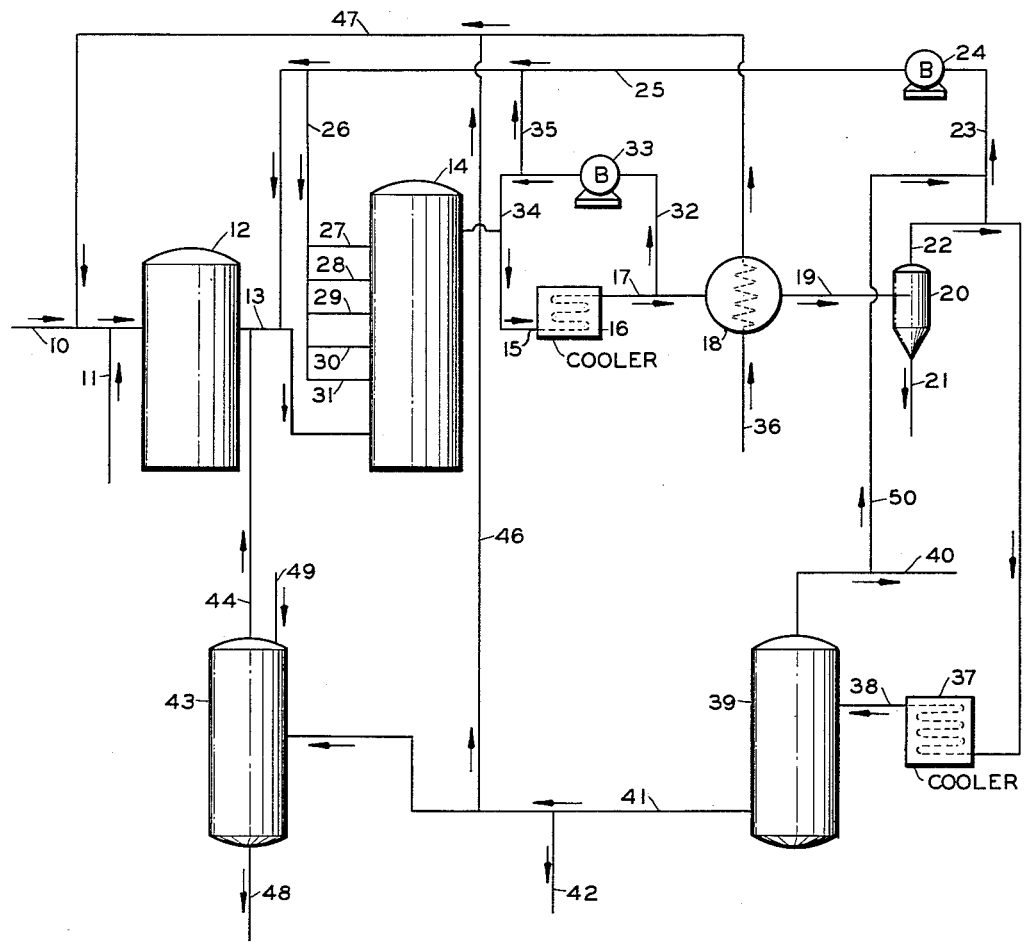

2,716,053
CARBON BLACK PRODUCTION

Bertrand J. Mayland, Bartlesville, Okla., assignor to Phillips Petroleum Company, a corporation of Delaware Application July 14, 1950, Serial No. 173,739

10 Claims. (Cl. 23—209.5)

This invention relates to a process for the production of carbon black. In one of its aspects, it relates to the production of carbon black from carbon monoxide. In another of its aspects, it relates to a process for the production of carbon black from various carbon-containing compounds and for the concomitant production of a catalyst employed in the production of said carbon black.

Production of carbon black in this country is substantially entirely by decomposition of hydrocarbons. The processes accounting for substantially all the carbon black produced are the channel process, furnace process, and thermal decomposition process. The furnace and channel processes are especially good from the standpoint of product quality. However, these processes are limited with respect to the type of hydrocarbon which is suitable as a charge stock.

In Europe, carbon black has been produced by oxidation of a carbonaceous material to carbon monoxide and then producing carbon black from the carbon monoxide by utilizing the reaction:

$$2CO \rightleftharpoons CO_2 + C$$

The conditions favoring production of carbon by this reaction are a relatively low temperature and an elevated pressure. The reaction was most commonly practiced in the presence of a metallic catalyst, and the resulting carbon black was contaminated with metal particles. This contaminated carbon black is not well suited for many uses, and particularly is it unsuited for rubber reinforcement.

The process of the present invention provides improved methods for controlling the carbon-producing reaction whereby high yields of carbon black are obtained as well as high rates of reaction and improved control of the reaction. The invention comprises the steps of partial combustion of a hydrocarbon, coke or other suitable carbon containing material to produce a hot gas stream containing a substantial amount of carbon monoxide which can be substantially free of elemental carbon and then quenching the hot gas containing said carbon monoxide with a relatively cold tail gas stream containing minor amounts of unseparated carbon black to a temperature below that at which undesirable side reactions take place but still in the range at which carbon monoxide reacts at a high rate to form carbon black. The quenched gas is then passed to a reaction zone wherein carbon black is formed from the carbon monoxide and wherein the carbon black contained in the relatively cold tail gas employed as a quenching medium acts as a catalyst for the carbon black producing reaction. The stream containing carbon black formed in said reaction zone is subsequently further cooled and the carbon black recovered. A part of the gas stream remaining after carbon black recovery and which contains a minor amount of unseparated carbon black is then used as a catalyst-bearing quench gas for fresh hot gas from the carbon monoxide producing zone.

In another embodiment, the carbon monoxide producing zone is operated under such conditions that the hot carbon monoxide containing gas emerging therefrom contains a minor amount of elemental carbon which will act as a catalyst for the carbon monoxide to carbon reaction. In such an embodiment a cool tail gas stream can be employed as a quench for the hot gas emerging from the carbon monoxide producing zone and further, if desired, can contain carbon to act as an additional catalyst for the carbon monoxide to carbon reaction.

It is an object of this invention to provide a process for the production of carbon black from carbonaceous materials.

Another object of this invention is to provide a process for the production of carbon black from carbon monoxide in the presence of a catalyst comprising elemental carbon derived from a quench gas stream.

Still another object of this invention is to provide a process for the production of carbon black wherein a hot carbon monoxide containing stream is quenched with a tail gas stream containing minor amounts of elemental carbon which is in such a physical state that it will readily function as a catalyst in the production of carbon black from said carbon monoxide.

Yet another object of this invention is to provide a process for the production of carbon black from carbonaceous materials wherein said materials are reacted to produce a carbon monoxide stream containing catalytic amounts of elemental carbon which can be cooled and caused to form carbon black in a succeeding reaction zone.

Various other objects and advantages of this process will be apparent to one skilled in the art upon reading the disclosure and appended claims.

For the purpose of discussion and explanation, it is suitable to consider the specific case of conversion of methane to carbon black through the general steps of the process of this invention. However, it is to be understood that the same concept applies to the conversion of other carbonaceous materials such as coal, coke, tar, liquid hydrocarbons as well as to other normally gaseous hydrocarbons to carbon monoxide. Ideally the partial combustion of one mole of methane to form carbon monoxide will theoretically produce two moles of hydrogen and one mole of carbon monoxide will require one-half mole of oxygen. In the actual case, the equilibrium which exists for the reaction requires that excess oxygen be used in the combustion zone in order to prevent formation of carbon therein. The resulting mixture produced by such an actual reaction contains hydrogen, carbon monoxide, water vapor, carbon dioxide and unconverted methane. The amount of oxygen employed can be near the minimum amount which is necessary to prevent any substantial carbon formation in the combustion zone, and under these circumstances, it will be substantially completely reacted. In accordance with the embodiment of this invention wherein minor amounts of elemental carbon are produced in the combustion zone to act as a catalyst in the subsequent carbon monoxide to carbon reaction zone, the amount of oxygen employed in the combustion zone is limited to such an extent that the required amount of carbon is produced therein.

The gaseous effluent of the combustion zone upon being cooled reacts as dictated by the equilibrium and kinetics at the lower temperatures; carbon is formed from the carbon monoxide and the oxygen released by the reduced carbon monoxide is taken up by either hydrogen or additional carbon monoxide with the resultant formation of water vapor and/or carbon dioxide, respectively.

The process of this invention in utilizing the concept of quenching the combustion zone effluent with a relatively cold tail gas from the carbon monoxide to carbon reaction zone effects improvements over the processes of the prior art. This quench effects cooling of the combustor effluent to a temperature below the maximum temperature at which carbon will be formed from carbon monoxide and yet to a temperature high enough such that the rate of carbon formation from carbon monoxide is rapid. In a non-catalytic combustor wherein methane is being combusted to form carbon monoxide, the reaction temperature is ordinarily above about 2300° F. in order to obtain high conversion of the methane. However, the effluent, even when using preheated methane and oxygen to attain the desired temperature in the combustor, must ordinarily be cooled to between 1300° F. and 1900° F. in order to form the desired carbon black from the carbon monoxide produced in the combustion zone. Substantially no carbon is possible thermodynamically above this range, and the rate of carbon production below this range is much too low to be useful. A pressure within the range of 10 to 40 atmospheres is preferable in the combustor and in the carbon monoxide to carbon reaction zone. The lower pressure limit is dictated by the adverse effect of low pressure on potential carbon production in the carbon monoxide to carbon reaction zone and the upper limit is determined by the adverse effect of high pressure on conversion of methane to carbon monoxide in the combustor.

It is possible and may be desirable in some instances to use a catalyst in the combustor in order to reduce the combustion temperature and still effect high methane conversion. In this manner, the oxygen-hydrocarbon ratio in the feed to the combustor may be reduced, and the maximum operating temperature of the carbon-producing zone and potential carbon production raised. Aluminum oxide and similar catalysts may be utilized in the combustor.

The attached figure illustrates one specific embodiment of the present invention. In the figure, a preheated natural gas comprising predominately methane is conducted through line 10 and preheated oxygen is introduced through line 11, while maintaining the mixture below its ignition temperature. The resulting mixture is introduced into converter 12 and therein burned to produce a gas having a high concentration of carbon monoxide. The pressure and temperature maintained in the converter are within the range of 10 to 40 atmospheres and within the range of 2300 to 3000° F., respectively. The temperature employed in converter 12 is maintained by adjusting the oxygen-to-hydrocarbon ratio. Ordinarily a molar ratio of oxygen to hydrocarbon within the range of 0.6:1 to 1:1 is satisfactory. When an oxygen-to-hydrocarbon ratio within this range is employed, the gaseous product of reactor 12 is oxidizing with respect to carbon, and consequently substantially no carbon is present. The space velocity can be within the range of 1500 to 4000 volumes of gas per volume of reactor space per hour.

The gas produced in reactor 12 is removed through line 13 and quenched by relatively cold tail gas, whose source is to be described, and cooled to a temperature in the range above 1300° F. and below the carbon-forming threshold temperature, i. e. 1900° F. The quenching is preferably effected to cool the stream to between 1400 and 1550° F., wherein the best conditions of equilibrium and rate of reaction are found. The tail gas used in the quench preferably contains some residual unseparated carbon black which acts as a catalyst and starts the carbon-forming reaction with the resultant reduction of time ordinarily encountered as an induction period. The direct quench with tail gas is preferable to indirect cooling in that it needs no heat exchange surfaces while the carbon monoxide-containing gas is in the carbon-forming temperature range. Such indirect heat exchange cooling surfaces would become coated with carbon and rapidly lose efficiency. Thus, the quench not only provides a means for adding catalytic carbon to the carbon monoxide to carbon reaction and for cooling the carbon monoxide-containing gas stream to a suitable reaction temperature, but it also retains its effectiveness over an unlimited length of time.

Upon quenching, the cooled stream is introduced to carbon production zone 14, wherein the carbon black is formed as previously discussed within a reaction time of 1 to 60 minutes. The product stream of reacted gas and suspended carbon black is removed from zone 14 through line 15 and quenched to a temperature below about 1200° F. and preferably below 1000° F. by a relatively cool stream of gas and suspended carbon black introduced through line 34. This quench stops the carbon-forming reaction, which at this point is quite slow but is undesirable in the next cooling step to be described. This total stream is introduced to cooler 16, which can be an indirect cooler such as a long air-cooled pipe or the cooler can be an indirect water-cooled heat exchanger. From cooler 16, the stream is removed through line 17, and a portion removed through line 32, conducted to blower 33 and thence through line 34 to line 15 as the previously-described quench stream. The remainder of this stream is then conducted to heat exchanger 18, where the feed hydrocarbon is preheated and the product-containing stream cooled to a temperature of about 300 to 400° F. The feed gas stream is conducted (from a source not shown) through line 36 to heat exchanger 18, then through line 47 to line 10. The cooled carbon black-containing stream is removed through line 19 to carbon recovery zone 20, which can comprise a cyclone separator, electrical precipitator, or other suitable means. From 95 to 99 per cent of the carbon black is separated from the accompanying gases and is removed through line 21. The tail gas containing residual unseparated carbon black is removed through line 22. A portion of this tail gas and the carbon black therein contained is passed through line 23, blower 24 and line 25 to line 13, where it quenches the combustor effluent from reactor 12 as previously described. The amount of tail gas employed as a quench in line 13 should be sufficient to lower the temperature of the effluent carbon monoxide-containing gases from reactor 12 to a temperature within the range of 1300 to 1900° F. Ordinarily, from 0.5 to 3 volumes of tail gas per volume of effluent from reactor 12 is satisfactory.

The remaining portion of the stream in line 22 can be used as fuel, discarded, or used in any other suitable manner. In this specific embodiment, however, the gas is cooled to about atmospheric temperature in cooler 37 and then conducted through line 38 to separation zone 39. In this zone, the carbon dioxide is separated from other gases by any suitable means such as by absorption in an aqueous monoethanolamine solution. Unabsorbed gases comprising principally carbon monoxide and hydrogen are removed from zone 39 through line 40. The carbon dioxide is stripped from the absorbent and removed from zone 39 through line 41 and may be removed from the system through line 42 and suitably utilized.

The carbon dioxide from separation zone 39 can be utilized to produce additional carbon black. This can be accomplished by passing all or a portion of the carbon dioxide from zone 39 through line 41 to reduction zone 43, wherein it contacts hot carbon at a temperature between 1400 and 2300° F. and reacts to form carbon monoxide. The resulting carbon monoxide is removed through line 44 and passed to the combustor effluent line 13 to be quenched by cool tail gases from line 25 as previously described. The heating of reduction zone 43 may be intermittent blowing with air from line 49 which passes through zone 43 and heats the carbon therein by combustion thereof. The solid combustion products such as ashes, are removed through line 48.

Another way of utilizing at least a portion of the carbon dioxide separated in zone 39 is to remove a portion of it from line 41 through line 46 and add it to the feed gas carried in line 47. The carbon dioxide is thus conducted to combustor 12, wherein it enters into the combustion reaction and is reduced to carbon monoxide.

Returning to the quenching of the carbon monoxide stream, a modification of the single quench already described is to split the recycle tail gas stream carried in line 25. A portion of the stream from line 25 is then added to line 13 to quench the stream entering zone 14. The remaining portion of the quench stream from line 25 is conducted through line 26 and added multipointwise through lines 27, 28, 29, 30, and 31 to zone 14. In this way, the reduction of temperature of the stream of carbon monoxide-containing gas from reactor 12 is effectively quenched before it enters carbon production zone 14; and, as the temperature rises in zone 14 due to the exothermic reaction of carbon monoxide to form carbon black additional quench gas is added multipointwise to reduce the temperature in zone 14 to a more favorable level for carbon black production.

In another modification, no gas is passed from line 22 to line 23 and a portion of the carbon dioxide-free stream carried in line 40 is conducted through line 50 to line 23, blower 24 and line 25. To this stream is added a small amount of the stream carried in line 34 by way of line 35 in order to add the desired catalytic amount of carbon black to the quench stream. In this particular modification, the quench stream contains very little carbon dioxide, but does contain a substantial amount of carbon monoxide. Thus, the equilibrium in zone 14 is favorably affected with respect to carbon production. This stream can be used in either of the two quench methods described for cooling the combustor effluent.

The portion of gas carried by line 40 which is not recycled can be processed to recover hydrogen, or it can be used as fuel gas to preheat the reactant oxygen and natural gas. Where external heating of the feed natural gas is used, the heated gas enters the system through line 10 and lines 36 and 47 are not used.

In another preferred embodiment of this invention, the conditions in reactor 12 are adjusted so that the effluent carbon monoxide-containing stream in line 13 will contain sufficient elemental carbon to catalyze the carbon monoxide to carbon reaction in zone 14. The conditions which are to be employed in reactor 12 to achieve the desired production of catalytic amounts of elemental carbon therein include a deficiency (in terms of that necessary to produce an elemental carbon-free effluent) of oxygen. The amount of oxygen employed is ordinarily within the range of 0.45 to 0.65 mole of oxygen per mole of methane when the latter is the hydrocarbon being converted to carbon monoxide. A similar oxygen concentration is employed for other carbonaceous materials. Other conditions to be employed include a space velocity of 1500 to 3000 volumes of gas per volume of reaction space per hour, a temperature within the range of 2300 to 2840° F. and a pressure within the range of 10 to 40 atmospheres. The effluent from zone 12 will preferably contain from 0.05 to 1.0 weight per cent elemental carbon. As in the foregoing description of the other embodiments of this invention, the effluent in line 13 should be quenched to a temperature within the range of 1300 to 1900° F. by means of a cool tail gas from line 25 which can have as its source the carbon-containing gas from carbon recovery zone 20, or the carbon dioxide-free stream from line 40. When employing the latter as a quench medium, the carbon ordinarily introduced into line 25 from line 35 can be dispensed with since the catalytic carbon employed in zone 14 is produced in zone 12.

Alternatively, instead of employing a deficiency of oxygen in reactor 12, a normal amount of oxygen, i. e. a molar ratio of oxygen to hydrocarbon of 0.6:1 to 1:1 can be employed and the catalytic amounts of elemental carbon produced by insufficiently mixing the oxygen with the hydrocarbon in reactor 12 to thereby afford incomplete combustion therein. Incomplete mixing of the oxygen and hydrocarbon can be accomplished by injecting the oxygen and hydrocarbon into reactor 12 as separate streams. Thus, instead of admixing hydrocarbon from line 10 and oxygen from line 11 prior to their introduction into reactor 12, all or part of the oxygen or the hydrocarbon from lines 11 and 10, respectively, can be injected directly into reactor 12. In order to control the amount of catalytic carbon formed, part of the hydrocarbon can be injected directly into reactor 12 and the remainder thoroughly admixed with the oxygen stream before passing into reactor 12. Alternatively, the oxygen can be divided in the same manner to be in part directly injected and in part admixed. The exact amount of incomplete admixing can be readily determined by mere routine test to yield the desired amounts of catalytic carbon. Other conditions to be employed in reactor 12 according to this modification include a pressure within the range of 10 to 40 atmospheres, a temperature within the range of 2300 to 3000° F. and a space velocity within the range of 1500 to 4000 volumes of gas per volume of reaction space per hour.

It will be recognized that although the invention has been described with the use of oxygen as the combustion-supporting gas, air or oxygen-enriched air can also be used. Also, carbon-containing materials other than natural gas can be used to produce the carbon monoxide, these materials including coal, coke, tar, liquid hydrocarbons and the like. When employing the latter, the conditions maintained in zone 12 are within the range of those set for the above for methane and natural gas.

While the invention has been described in connection with present, preferred embodiments thereof, it is to be understood that this description is illustrative only and is not intended to limit the invention, the scope of which is defined by the appended claims.

I claim:

1. In a process for producing carbon black from carbon monoxide wherein said carbon monoxide is produced in a first zone by the controlled oxidation of a carbonaceous substance at a temperature within the range of 2300 to 3000° F. and under a pressure within the range of 10 to 40 atmospheres and wherein the effluent from said first zone containing said carbon monoxide is reacted in a second zone at a temperature within the range of 1300 to 1900° F. to produce said carbon black, the improvement which comprises cooling the effluent from said second zone, separating from 95 to 99 per cent of carbon black produced in said second zone from effluent gas accompanying said carbon black from said second zone while permitting the remaining carbon black to remain in said gases, said cooling lowering said separated gas containing said unseparated carbon black to a temperature within the range of 300° to 400° F., and rapidly quenching the effluent from said first zone with said cooled gas containing said unseparated carbon black to the reaction temperature of said second zone whereby there is provided from said quench catalytic carbon black for catalyzing the reaction of said second zone.

2. In a process for producing carbon black from carbon monoxide wherein said carbon monoxide is produced in a first zone by the controlled oxidation of carbonaceous substances at a temperature within the range of 2300 to 3000° F. and under a pressure within the range of 10 to 40 atmospheres and wherein the effluent from said first zone containing said carbon monoxide is reacted in a second zone at a temperature within the range of 1300 to 1900° F. to produce said carbon black, the improvement which comprises cooling the effluent from said second zone separating from 95 to 99 per cent of carbon black produced in said second zone from effluent gas accompanying said carbon black from said second zone while permitting the remaining carbon black to remain in said gases, said cooling lowering said separated gas containing said unseparated carbon black to a temperature within the range of 300 to 400° F., rapidly quenching the effluent from said first zone with said cooled gas containing said unseparated carbon black to the reaction temperature of said second zone whereby there is provided from said quench catalytic carbon black for catalyzing the reaction of said second zone and controlling the temperature of said second zone by injecting a portion of said cooled effluent gas into said second zone.

3. In a process for producing carbon black from carbon monoxide wherein said carbon monoxide is produced in a first zone by the controlled oxidation of carbonaceous substances at a temperature within the range of 2300 to 3000° F. and under a pressure within the range of 10 to 40 atmospheres wherein the effluent from said first zone containing said carbon monoxide is reacted in a second zone at a temperature within the range of 1300 to 1900° F. to produce said carbon black, the improvement which comprises cooling the effluent from said second zone, separating a major proportion of the carbon black produced in said second zone from the effluent gas accompanying said carbon black from said second zone while permitting a catalytic amount of carbon black to remain in said effluent gases, thereby cooling said separated gas containing said unseparated carbon black, and quenching the effluent from said first zone with said cooled gas containing said unseparated carbon black to the reaction temperature of said second zone whereby there is provided from said quench catalytic carbon black for catalyzing the reaction of said second zone.

4. In a process for producing carbon black from carbon monoxide wherein said carbon monoxide is produced in a first zone by the controlled oxidation of carbonaceous substances at a temperature above 2300° F. and under a superatmospheric pressure and wherein the effluent from said first zone containing said carbon monoxide is reacted in a second zone at a temperature within the range of 1300 to 1900° F. to produce said carbon black, the improvement which comprises cooling the effluent from said second zone, separating all of the carbon black except a catalytic amount produced in said second zone from said last effluent to produce a separated cooled gas containing a catalytic amount of carbon black, and quenching the effluent from said first zone with said separated cooled gas containing said unseparated carbon black to the reaction temperature of said second zone whereby there is provided at said quench catalytic carbon black for catalyzing the reaction of said second zone.

5. In a process for producing carbon black from carbon monoxide wherein said carbon monoxide is produced in a first zone by the controlled oxidation of carbonaceous substances at a temperature within the range of 2300 to 3000° F. and under a pressure within the range of 10 to 40 atmospheres and wherein the effluent from said first zone containing said carbon monoxide is reacted in a second zone at a temperature within the range of 1300 to 1900° F. to produce said carbon black, the improvement which comprises cooling the effluent from said second zone, separating the carbon black produced in said second zone from said last effluent, removing carbon dioxide from said effluent gas, admixing a catalytic amount of carbon black from the effluent from said second zone with said carbon dioxide-free gas, and rapidly quenching the effluent from said first zone with said carbon dioxide-free gas containing said carbon black to the reaction temperature of said second zone whereby there is provided at said quench catalytic carbon black for catalyzing the reaction of said second zone.

6. In a process for producing carbon black from carbon monoxide wherein said carbon monoxide is produced in a first zone by the controlled oxidation of carbonaceous substances at a temperature above 2300° F. and under a superatmospheric pressure and wherein the effluent from said first zone containing said carbon monoxide is reacted in a second zone at a temperature within the range of 1300 to 1900° F. to produce said carbon black, the improvement which comprises cooling the effluent from said second zone, separating out at least the major portion of the resulting carbon black from said last effluent, and quenching the effluent from said first zone with a cooled gas produced from said effluent from said second zone which contains a catalytic amount of said carbon black sufficient for catalyzing the reaction in said second zone to the reaction temperature of said second zone whereby there is provided at said quench catalytic carbon black for catalyzing the reaction of said second zone.

7. In a process for producing carbon black from carbon monoxide wherein said carbon monoxide is produced in a first zone by the controlled oxidation of carbonaceous substances at a temperature above 2300° F. and under a superatmospheric pressure and wherein the effluent from said first zone containing said carbon monoxide is reacted in a second zone at a temperature within the range of 1300 to 1900° F. to produce said carbon black, the improvement which comprises cooling the effluent from said second zone, separating the carbon black produced in said second zone from said last effluent, removing carbon dioxide from said effluent gas, admixing a catalytic amount of carbon black from the effluent from said second zone with said carbon dioxide-free gas, and quenching the effluent from said first zone with said carbon dioxide-free gas containing said carbon black to the reaction temperature of said second zone whereby there is provided at said quench catalytic carbon black for catalyzing the reaction of said second zone.

8. In a process for producing carbon black from carbon monoxide wherein said carbon monoxide and a minor amount of catalytic carbon black is produced in a first zone by the controlled oxidation of carbonaceous substances at a temperature above 2300° F. and under a superatmospheric pressure and wherein the effluent from said first zone containing said carbon monoxide and carbon black is reacted in a second zone at a temperature within the range of 1300 to 1900° F. to produce said carbon black, the improvement which comprises cooling the effluent from said second zone, separating out at least the major portion of the resulting carbon black from said last effluent, and quenching the effluent from said first zone with a cooled gas produced from said effluent from said second zone which contains an additional catalytic amount of said carbon black which with the carbon black present in said first effluent from said first zone is sufficient for catalyzing the reaction in said second zone, to the reaction temperature of said second zone, whereby there is provided at said quench catalytic carbon black for catalyzing the reaction of said second zone.

9. In a process for producing carbon black from carbon monoxide wherein said carbon monoxide and a minor amount of catalytic carbon black is produced in a first zone by the controlled oxidation of carbonaceous substances at a temperature above 2300° F. and under a superatmospheric pressure and wherein the effluent from said first zone containing said carbon monoxide and carbon black is reacted in a second zone at a temperature within the range of 1300 to 1900° F. to produce said carbon black, the improvement which comprises cooling the effluent from said second zone, separating out at least the major portion of the resulting carbon black from said last effluent, and quenching the effluent from said first zone, with a cooled gas produced from said effluent from said second zone in the presence of a catalytic amount of carbon black sufficient for catalyzing the reaction in said second zone, to the reaction temperature of said second zone, whereby there is provided at said quench catalytic carbon black for catalyzing the reaction of said second zone.

10. In a process for producing carbon black from carbon monoxide wherein said carbon monoxide is produced in a first zone by the controlled oxidation of carbonaceous substances at a temperature above 2300° F. and under a superatmospheric pressure and wherein the effluent from said first zone containing said carbon monoxide is reacted in a second zone at a temperature within the range of 1300 to 1900° F. to produce carbon black, the improvement which comprises cooling the effluent from said second zone, separating out at least the major portion of the resulting carbon black from said last effluent, and quenching the effluent from said first zone, with a cooled gas produced from said effluent from said second zone in the presence of a catalytic amount of carbon black sufficient for catalyzing the reaction in said second zone, to the reaction temperature of said second zone, whereby there is provided at said quench catalytic carbon black for catalyzing the reaction of said second zone.

References Cited in the file of this patent

UNITED STATES PATENTS

| | | |
|---|---|---|
| 1,352,162 | Williams | Sept. 7, 1920 |
| 1,812,230 | Aarts | June 30, 1931 |
| 1,844,327 | Lyder | Feb. 9, 1932 |
| 1,925,130 | Brownlee | Sept. 5, 1933 |
| 1,964,744 | Odell | July 3, 1934 |
| 2,346,754 | Hemminger | Apr. 18, 1944 |
| 2,491,518 | Riblett | Dec. 20, 1949 |